P. H. CRAVEN.
APPARATUS FOR CONCENTRATING ORE.
APPLICATION FILED MAY 17, 1910.
1,060,323.
Patented Apr. 29, 1913.
6 SHEETS—SHEET 2.
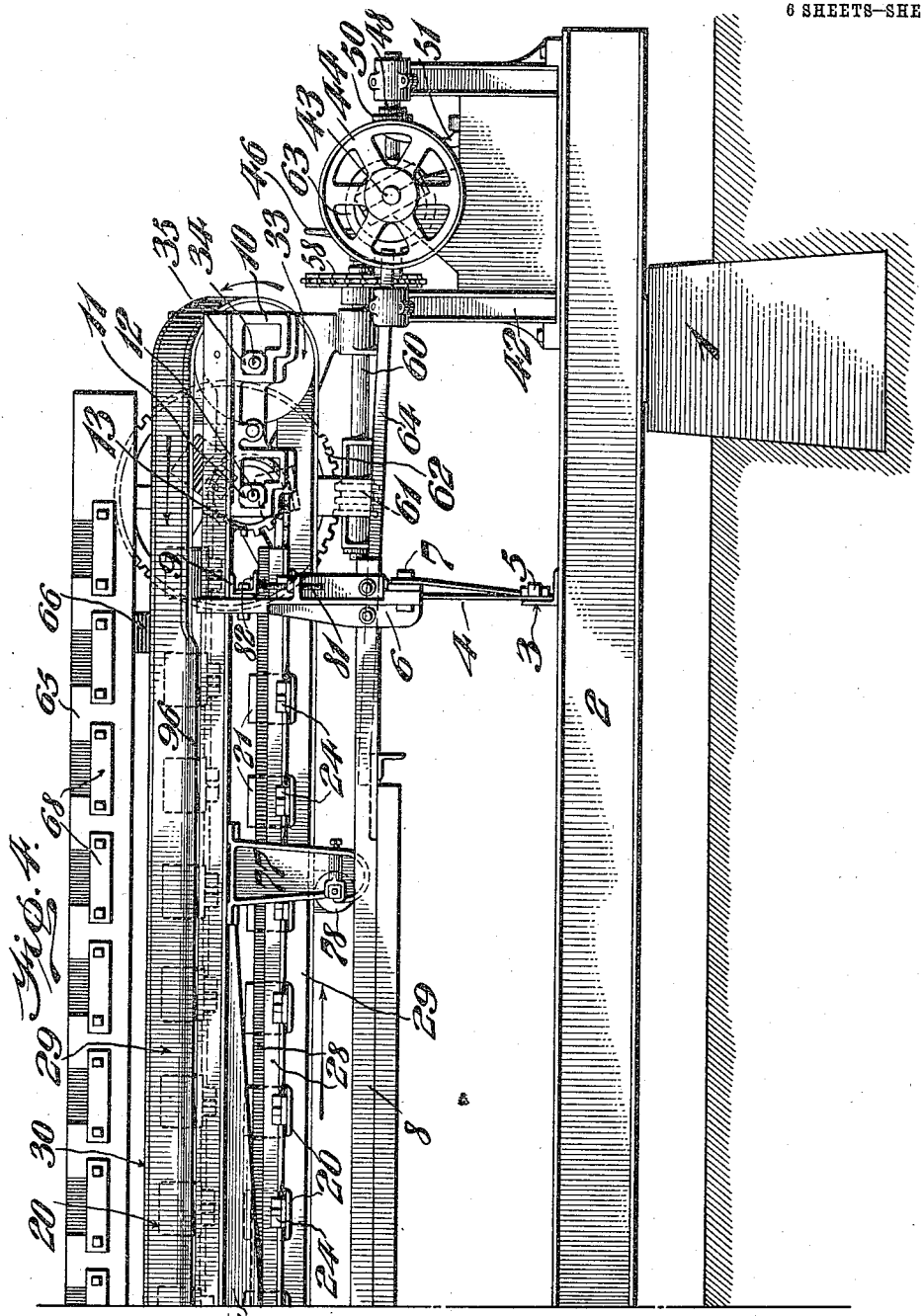
WITNESSES
INVENTOR
Peter H. Craven.
BY Wiedersheim & Fairbanks.
ATTORNEYS P. H. CRAVEN.
APPARATUS FOR CONCENTRATING ORE.
APPLICATION FILED MAY 17, 1910.
1,060,323.
Patented Apr. 29, 1913.
6 SHEETS—SHEET 3.
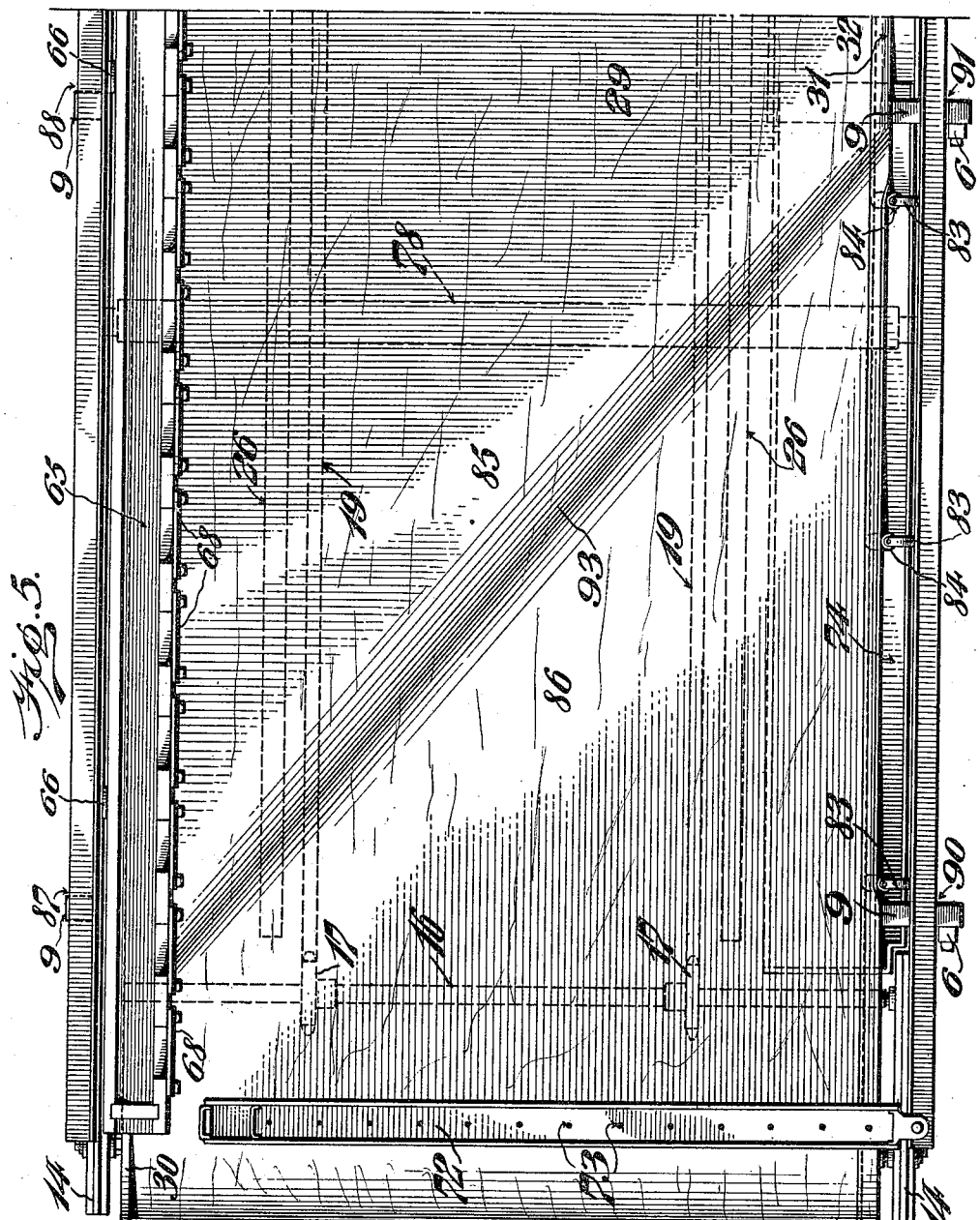

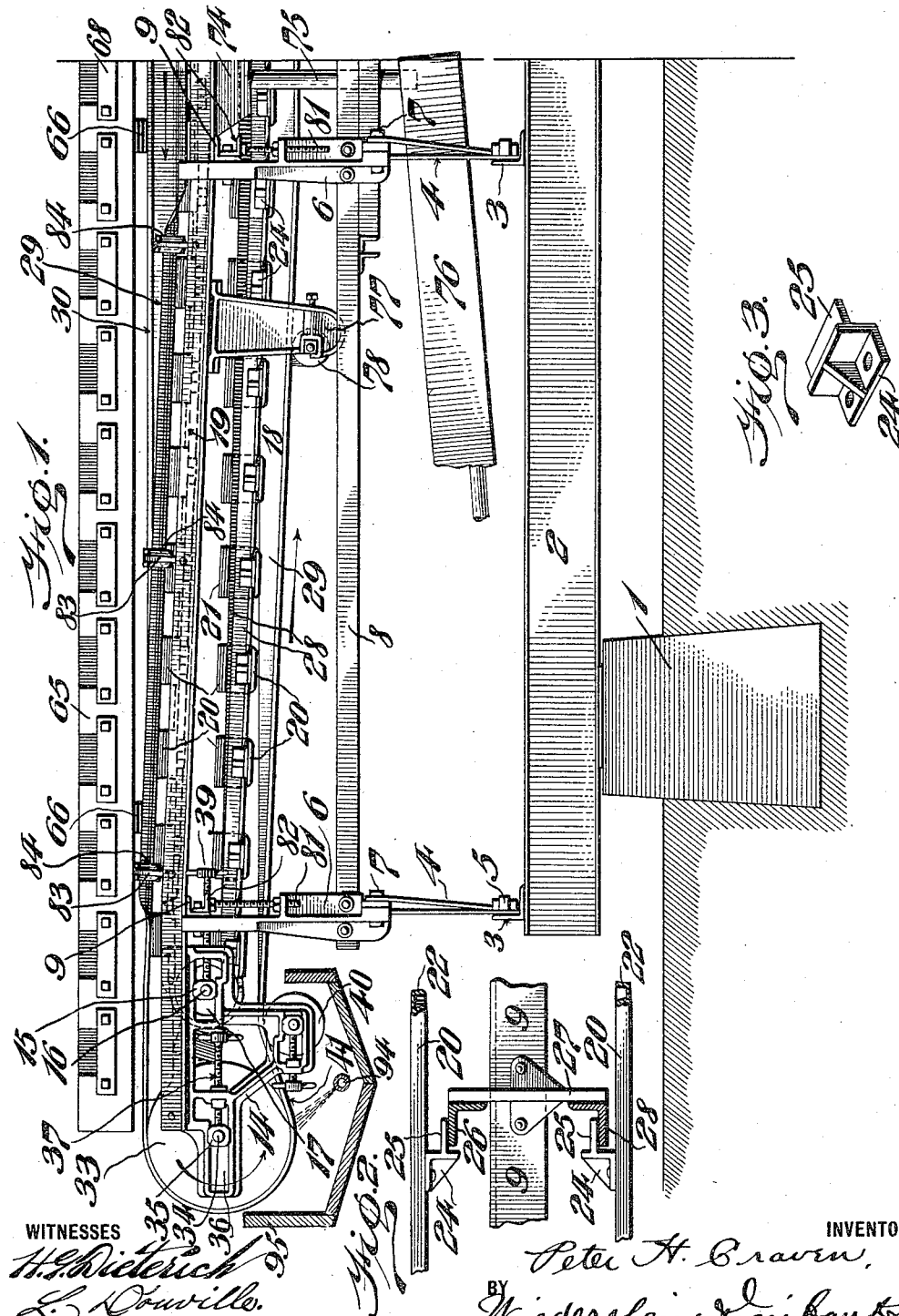

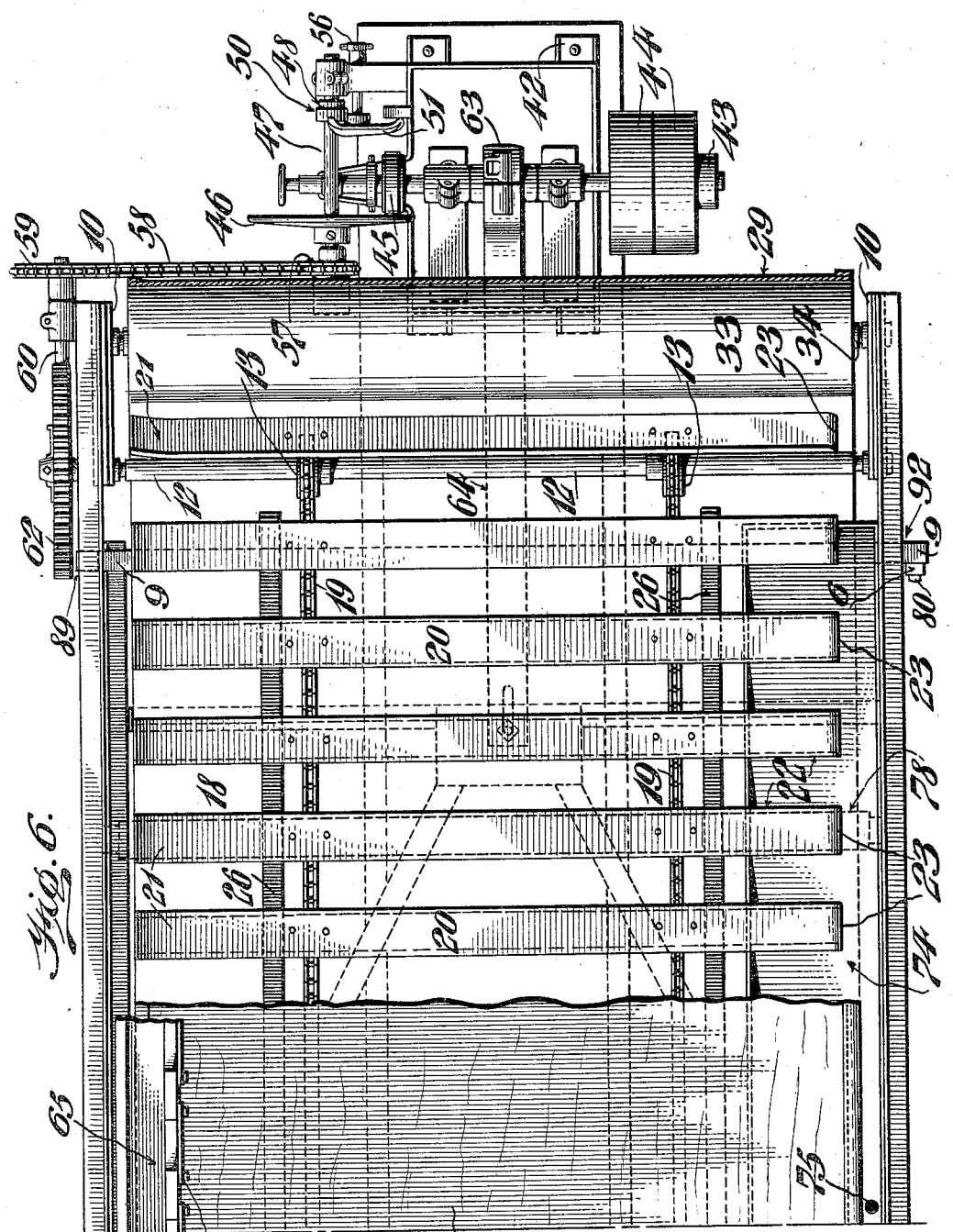

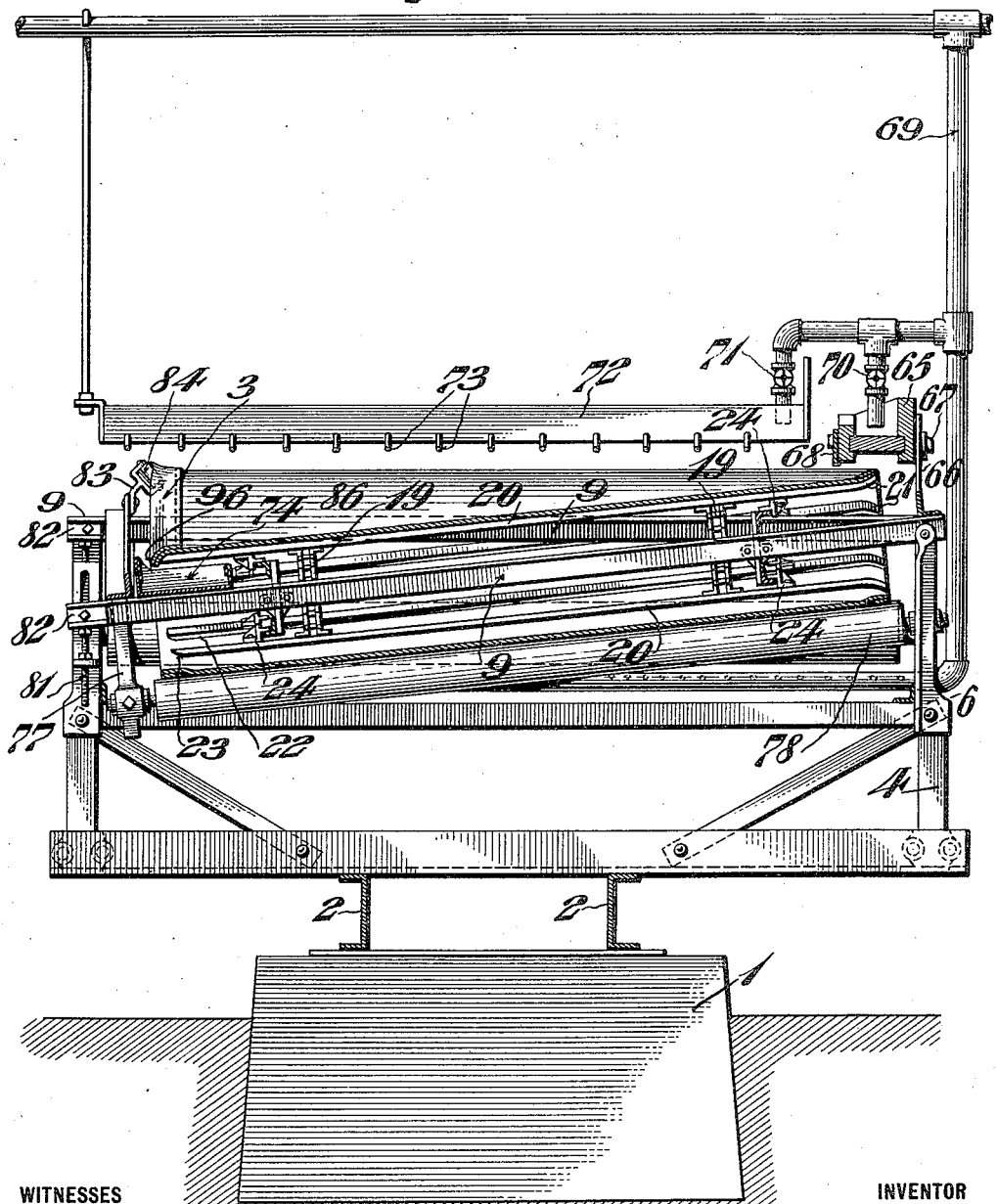

P. H. CRAVEN.
APPARATUS FOR CONCENTRATING ORE.
APPLICATION FILED MAY 17, 1910.
1,060,323.
Patented Apr. 29, 1913.
6 SHEETS—SHEET 6.
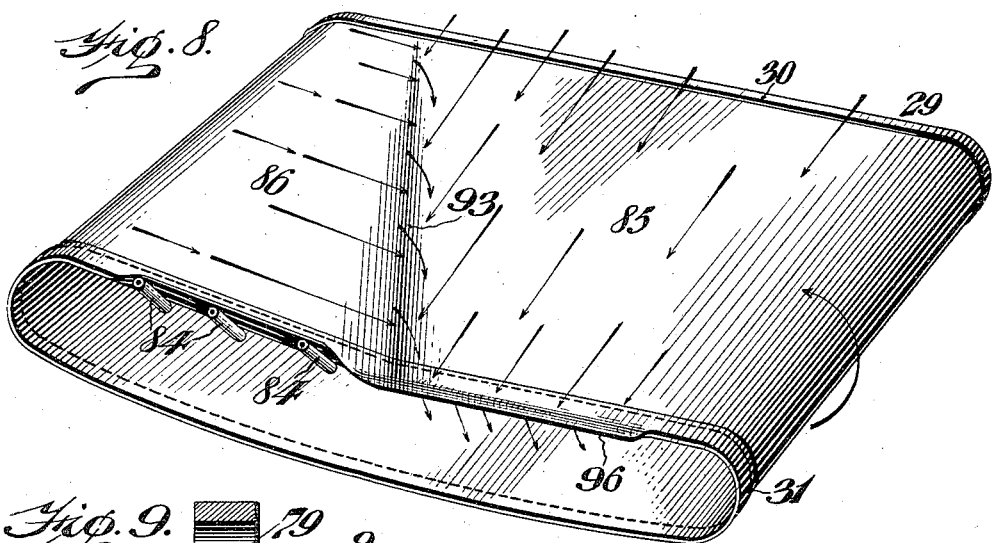
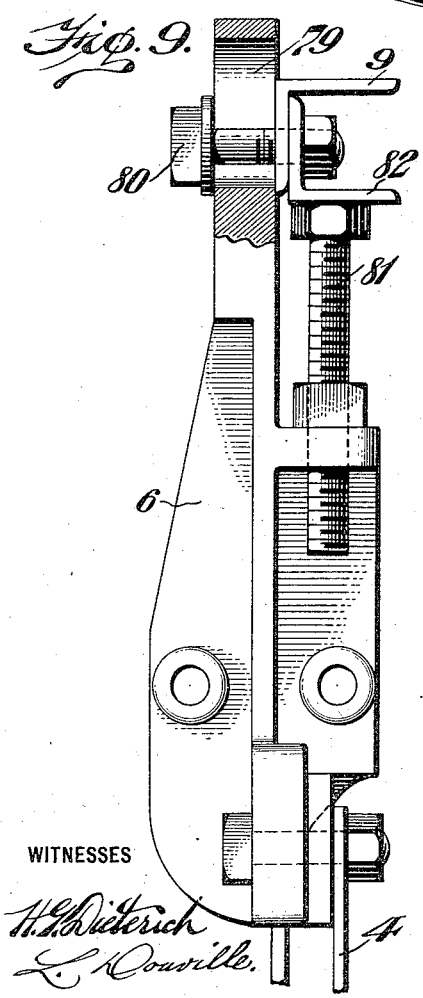
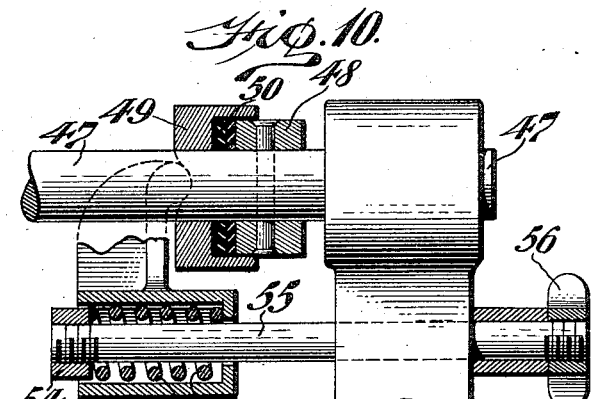
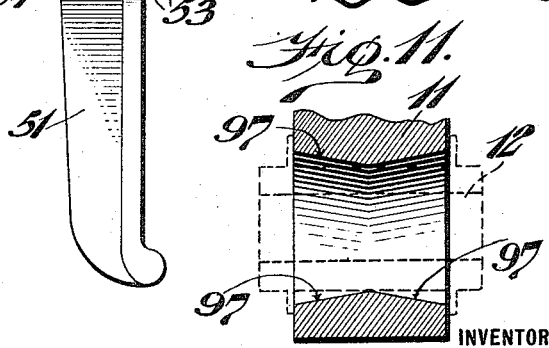
WITNESSES
INVENTOR
Peter H. Craven.
BY
Wiedersheim & Fairbanks
ATTORNEYS

UNITED STATES PATENT OFFICE.

PETER H. CRAVEN, OF SPOKANE, WASHINGTON, ASSIGNOR TO P. H. CRAVEN MA-CHINERY COMPANY, OF SPOKANE, WASHINGTON, A CORPORATION OF WASHINGTON.

APPARATUS FOR CONCENTRATING ORE.

1,060,323.   Specification of Letters Patent.   Patented Apr. 29, 1913.

Application filed May 17, 1910.   Serial No. 561,868.

*To all whom it may concern:*

Be it known that I, PETER H. CRAVEN, a citizen of the United States, residing in the city and county of Spokane, State of Washington, have invented a new and useful Apparatus for Concentrating Ore, of which the following is a specification.

My present invention consists of a novel apparatus for concentrating ores, by the employment of which a much larger proportion of the light particles of the ore is saved than has heretofore been deemed possible.

One of the objects of my invention is to impart to the concentrator surface a continuous travel, such in the present instance being caused by the friction or cohesion of the concentrator belt and the slatted belt, which latter is positively driven preferably by means of a frictional driving mechanism.

Another object of my invention is to obtain a perfect continuous or inclined surface, the slotted belt being positively driven and owing to the manner in which the concentrator belt is mounted on the slatted belt, a slight slippage between the slats and the concentrator belt is permitted so that a concentrator surface is provided which forms a perfect inclined plane, permitting no valleys or depressions at intervals between the slats and this surface is perfectly uniform throughout the ore dressing zone and relatively uniform throughout the ore washing zone, it being understood that the dividing line between these two zones may be varied as desired, in accordance with the conditions and requirements.

Another object of my invention is to provide a novel means for supporting the concentrator belt and novel means for adjusting the inclination of such belt.

With the above and other objects in view which will be hereinafter more particularly referred to, my present invention consists of a novel apparatus for concentrating wherein the concentrating surface travels in a transversely inclined plane and afterward in a transversely and longitudinally inclined plane.

My invention further consists of a novel apparatus for concentrating ores, wherein the concentrator surface is caused to continuously travel in a longitudinal direction, the ore being fed in proximity to the upper edge of a transversely inclined belt, shaped at its upper edge to prevent any back splashing and at its lower edge so as to afford a continuous vertical dripping edge, the ore being fed in such a manner and under such conditions as to permit a partial separation of the metallic content from the gangue to take place on the transversely inclined portion.

My invention further consists of novel means for adjusting the longitudinal and transverse pitch of the concentrator belt.

My invention further consists of a novel construction of an apparatus for concentrating wherein the entire machine is yieldingly supported, provision being made for causing the concentrator surface to be transversely inclined during a portion of its travel and transversely and longitudinally inclined during the next stage of its travel, and novel means being provided for causing the desired transverse and longitudinal flow of the wash and pulp waters.

My invention further consists of novel means for causing the concentrating surface to travel in a transversely inclined plane during the first stages of the concentrating operation and then through a transversely longitudinally inclined plane, during which latter movement, means is provided for raising the lower edge of the concentrator surface to prevent the wash water flowing over the side thereof.

It further consists of novel means for adjusting the friction feed.

My invention further consists of novel means for causing the travel of the concentrator surface and novel means for removing the concentrate therefrom.

My invention further consists of a novel construction for guiding the slatted belt during its travel and preventing buckling and unnecessary wear.

My invention further consists of a novel construction of supporting bracket, which co-acts with the frame work of the machine in a novel manner.

It further consists of a novel manner of adjustably mounting the journals of the concentrator belt shaft and the slatted belt shaft whereby the slatted belt and the concentrator belt will have the proper tension.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a portion of an ore concentrating device embodying my invention, the same being viewed from the lower side. Fig. 2 represents a sectional view of a portion of the device showing more particularly the manner in which the slatted belt is guided. Fig. 3 represents a perspective view of one of the guide members carried by the slats of the slatted belt. Fig. 4 represents a side elevation of the right hand portion of my machine, the same being viewed from the lower side. Fig. 5 represents a plan view of the left hand portion of the machine, certain parts thereof being removed for the sake of clearness of illustration. Fig. 6 represents a plan view of the right hand portion of the machine, certain parts thereof being removed for the sake of clearness of illustration. Fig. 7 represents a transverse section of the machine looking toward the left. Fig. 8 represents a perspective view of the ore concentrator belt in detached position, showing the zones which it forms during its travel and showing in addition, the manner in which the lower edge of the concentrator belt is raised during a portion of its travel. Fig. 9 represents a sectional view of a portion of the machine showing more particularly the means for adjusting the pitch of the concentrating surface. Fig. 10 represents a sectional view of a portion of the device, showing more particularly the manner in which the friction of the driving mechanism may be adjusted. Fig. 11 represents a sectional view, showing more particularly the type of journal employed.

Similar numerals of reference indicate corresponding parts in the figures.

Referring to the drawings:—1 designates standards on which are mounted the channels 2 to which latter are secured the brackets or angle bars 3.

The machine is so constructed as to afford a firm base fixed at suitable points so as to obtain the desired transverse and longitudinal flows.

4 designates a desired number of vertically arranged springs the lower ends of which are secured to the angles 3 by means of suitable fastening devices 5, the upper ends of said springs being secured to the brackets 6 by means of suitable fastening devices 7. Any desired number of springs may be employed but, in the present instance, I preferably employ three springs located on each side of the machine thereby providing six points of support for the operating mechanism. The brackets 6 are bolted or otherwise secured to the lower frame-work 8 and also to the upper frame-work 9.

10 designates a bracket which is carried by the upper frame-work 9, said bracket having mounted thereon the journal boxes 11, in which is mounted a shaft 12, on which are mounted a plurality of sprocket wheels 13. The opposite end of the frame is provided with a bracket 14 in which is mounted the journal boxes 15, the latter being adapted to receive the shaft 16 to which are secured a plurality of sprocket wheels 17.

18 designates a slatted belt the same consisting, in the present instance, of the sprocket chains 19 to which are secured transversely extending slats 20. One end of each of the slats 20 is upwardly deflected as indicated at 21. The slats 20 may be made of any desired material and if made of metal it is preferable in some cases to deflect the sides thereof downwardly, as indicated at 22, in order to reinforce the same. The ends of the slats 20 opposite to the deflected ends 21 curve downwardly from their upper surface, as is clearly shown at 23. In order that the slatted belt 18 may be properly guided in its movement the slats 20 thereof have secured thereto the brackets 24, each of which is provided with a contact face or shoe 25, which travels upon the contact face 26 of a guide bracket 27, which latter is carried by the upper frame work 9, it being most clearly seen in Fig. 2 that the lower edge of the bracket is provided with a contact face 28, which co-acts with the underside of the guide bracket 24, to guide the return stretch of the belt and prevent the same from buckling or excessive wear or strain. The slats are secured to the sprocket chain 19 in such a manner that they can readily pass over the sprocket wheels.

29 designates the concentrating surface consisting in the present instance of a concentrator belt or apron, which latter is mounted on the slatted belt 18, but, in the present instance, it is not fixedly secured thereto and the travel of the concentrator belt 29 is caused by the frictional engagement thereof with the slatted belt 18. One side of the concentrator belt 29 is provided with a reinforcement 30 extending longitudinally thereof and which may be formed in any desired manner, but for the purpose of illustration, I have preferred to show the same as being produced by deflecting the edge of the concentrator belt 29 upon itself and securing the parts together in any suitable manner. The opposite edge of the concentrator belt 29 is provided with a riffle 31 which may be formed in any suitable manner but which, in the present instance, is formed by deflecting a portion of the belt upon itself and securing the parts in assembled position in any desired manner, such riffle 31 extending longitudinally of the belt and forming a pool at 32.

The concentrator belt 29 passes over the end rollers 33 which are carried by the shafts 34 mounted in journals 35 in the brackets 10 and 14. The journals 35 at one end of the machine are adjustably mounted, the brackets 14 being provided with means for longitudinally adjusting such journals to adjust the distance of the rollers 33 from each other so as to take up any improper stretch of the concentrator belt 29. In the present instance this is accomplished by providing the brackets 14 with a recess 36 in which latter the journal boxes are mounted, said boxes being maintained in their adjusted position by means of adjusting screws 37. The journal boxes 15 are also longitudinally adjustable, the bracket 14 being provided with a recess 38 in which the journal 15 is mounted, the same being longitudinally adjustable owing to the provision of the set screw 39 which contacts with said box and is carried by the bracket 14.

40 designates a roller suitably mounted in the bracket 14 and longitudinally adjustable therein and engaging the concentrator belt on its return stretch and provides a downwardly inclined portion, as indicated at 41, the purpose of which will hereinafter appear in connection with the removal of the concentrate from the belt.

The channels 2, in the present instance, have mounted thereon the standard 42 in which is suitably journaled a shaft 43 having mounted thereon pulleys 44 thereby adapting the same to receive a suitable driving belt. The shaft 43 has mounted thereon a friction wheel 45 of any desired or conventional type. The friction wheel 45 co-acts with a friction disk 46 mounted on the shaft 47 suitably journaled in the standards 42. The shaft 47, as seen most clearly in Fig. 10, has mounted thereon an abutment 48 with which is adapted to co-act a collar 49, suitable friction material 50 being interposed between the abutment and collar.

51 designates a lever, one end of which engages the collar 49 and the other end thereof engaging a fixed abutment 52 on the frame, said lever being suitably recessed to receive a spring 53, one end of which abuts against the end wall of the recess while the other end thereof contacts with a nut 54 of less diameter than the diameter of the chamber and having engagement with a rod 55 which may be manually adjusted by means of the nut 56 to vary the frictional engagement of the friction wheel 45 with the friction disk 46.

The shaft 47 has mounted thereon a sprocket wheel 57 with which latter co-acts a sprocket chain 58, the latter also passing around the sprocket wheel 59 mounted on the shaft 60 suitably journaled in the frame work of the machine. The shaft 60 is provided with a worm gear 61 which co-acts with the gear wheel 62, which latter is mounted on the shaft 12 on which the sprocket wheels 13 are mounted, with which the sprocket chain 19 of the slatted belt 18 co-acts. The shaft 43 is provided with an eccentric 63 to which is secured a connecting rod 64, the outer end of which is adjustably secured to the lower frame-work 8.

65 designates the pulp distributing box which is adjustably mounted on the bracket 66 carried by the upper frame-work 9 by means of adjusting devices 67 carried by the bracket 66. The distributing box 65 is provided with suitable gates 68. The distributing box has connected therewith a suitable water conduit 69 which is controlled by means of a valve 70, said conduit also being provided with a valve 71 to control the passage of water to the wash water box 72, which latter extends preferably transversely of the table and is provided with a plurality of discharge outlets 73.

74 designates a waste launder which is adapted to receive the water and wash from the concentrator belt 29, said launder being provided with a suitable conduit 75 which discharges into a receptacle 76. In order that the concentrator belt on its return stretch will be properly supported, I provide a desired number of brackets 77 carried by the frame-work 9 and having suitably mounted therein rollers 78 which engage the concentrator belt to prevent improper sagging of the same.

The brackets 6 on the lower side of the device are provided with slots 79, see more particularly Fig. 9, in which are mounted bolts 80 for securing the upper frame-work 9 with respect to the bracket 6 after the frame-work 9 has been adjusted to the proper pitch, this being accomplished by means of an adjusting bolt 81 which is mounted in the bracket 6 and adapted to engage a member 82 carried by the upper frame-work 9, and shown in the present instance as an angle bracket through which the bolt 80 extends.

83 designates brackets carried by the upper framework 9 and adapted to carry suitable anti-friction devices 84, such as rollers or other anti-friction devices, said rollers engaging the underside of the lower edge of the concentrator belt and causing the same to be slightly elevated to a desired degree in order to produce an elevated edge over which no concentrate can flow, and causing the wash water to flow in a reverse direction to the travel of the belt to a predetermined discharge point which may be varied to suit the desired practice.

The operation of my novel construction of ore concentrating device can be now readily understood and is as follows:—The machine is driven by means of a suitable driving belt co-acting with the pulley 44 on the shaft 43, whereby the friction wheel 45 will impart motion to the friction disk 46 and therefrom owing to the provision of the sprockets 57 and 59 and the sprocket chain 58 the shaft 60 will be actuated, thereby causing the worm 61 to actuate the gear 62 and thereby rotate the shaft 12 on which are mounted the sprocket wheels 13 with which co-acts the sprocket chain 19 of the slatted belt 18 so that a continuous longitudinal travel is imparted to the slatted belt 18. Since the concentrator belt 29 is loosely mounted on the slatted belt 18 and supported thereby a longitudinal travel will be imparted thereto owing to its frictional engagement with the slatted belt 18. The lower frame work 8, the upper frame work 9 and the operating mechanism carried thereby have imparted thereto a reciprocating movement owing to the provision of the eccentric 63 mounted on the shaft 43 and connected by means of a suitable connecting rod 64 with the lower frame-work 8, and since the lower frame-work 8 is mounted on resilient standards 4 a reciprocating movement is imparted to the entire frame work and thereby to the concentrator belt 29, which it is to be remembered is continuously traveling in a longitudinal direction.

The pulp or ore is conducted by any suitable means to the distributing box 65 which is located above the upper side of the transversely inclined concentrating belt 29. The passage of the pulp from the distributing box 65 to the concentrator belt is controlled by the gates 68 and the distributing box is constructed in such a manner that the lighter particles may flow over the gates 68 on to the concentrator belt 29.

Owing to the novel manner in which the concentrator belt is mounted and the novel movement imparted thereto, the pulp which is fed on to the ore concentrator belt will form a separate zone which for the sake of clearness I designate as the ore concentrating zone 85 and in the first stages of the concentrating operation the pulp will flow transversely across the ore concentrating zone 85, it being remembered that the concentrating belt 29 is continually traveling in a longitudinal direction.

The wash water which is conducted to the washer box 72 in any desired manner is fed therefrom through the discharge ports 73 on to that portion of the belt which for clearness of description I have designated as the ore washing zone 86. In order to obtain the ore concentrating zone 85 and the ore washing zone 86 the upper frame work is supported in a novel manner, whereby the area of such zones may be varied, and this novel feature of my invention will now be described.

The upper side of the frame-work 9 is adjusted in such a manner that the upper side of the concentrating belt will be in substantially the same horizontal plane and in order to clearly indicate this I designate the different points of supports on the upper side of the frame-work as 87, 88 and 89 and the points of support on the lower side as 90, 91 and 92, it being remembered that the number of supporting points may vary as desired. In order to provide for this adjustment the bearings are preferably provided with the reversely inclined faces 97 as will be understood by reference to Fig. 11.

In adjusting the machine the points 87, 88 and 89, as before stated, are in the same horizontal plane and the point of support 90 is in substantially the same horizontal plane as the points 87, 88 and 89 but in practice such point 90 is preferably slightly lower than the points of support on the upper side. The points 91 and 92 are depressed a desired distance in order to obtain the desired transverse inclination of the belt while the same is passing through the ore concentrating zone 85, it being apparent that the table is maintained in its adjusted position by tightening the bolts 80.

Having thus explained the manner in which the table is adjusted the novel path which the concentrator belt assumes in its travel can be readily understood. It will be seen that as the ore concentrator belt travels between the points 89, 92 and 88, 91, it will be transversely inclined, thereby forming a substantially uniform transversely inclined plane. As soon, however, as the pulp passes beyond the point 91 the concentrator belt will form a gradually increasing longitudinally inclined plane and a diminishing transversely inclined plane, it being understood that this longitudinally inclined plane inclines downwardly in a reverse direction to the longitudinal travel of ore concentrator belt, owing to the fact that the upper surface of the roller 33 at the outer end of the machine is higher than the upper surface of the slatted belt 18 as it passes over the sprocket wheel 17. The longitudinal and downward inclination of the belt will be in a direction reverse to that of the longitudinal movement of the belt. The water passing from the discharge outlets 73 of the washer box 72 on to the concentrator belt will flow very gently down this longitudinal inclination of the ore washing zone 86 in a direction reverse to the longitudinal movement of the concentrator belt, so that as the wash water comes into contact with the water and pulp which is flowing transversely across the ore concentrating zone a diagonal separating point 93 will be formed.

As the pulp is fed upon the concentrator belt 29 the machine is operated in such a manner as to permit the very fine particles of ore to settle upon this belt, the reciprocating movement being only sufficient to permit a separation of the metallic contents from the gangue or waste matter. The settled metallic particles having reached a state of rest are carried in a longitudinal direction to a point where they are acted upon by the wash waters in the ore washing zone 86. The waters of the ore washing zone 85 and the ore concentrating zone 86 converge at a point 93 which produces a current flowing in a diagonal direction which is sufficient to carry the separated gangue, sand or waste matter over the lower edge of the belt.

During the travel of the concentrator belt a pool is formed at its lower edge at 32 owing to the provision of the riffle 31. As the belt travels in a forward direction the riffle is assisted by the rollers 84 in forming an upward inclination of the lower edge of the concentrator belt so as to direct the wash water flowing in a reverse direction to the travel of the belt and prevent its flowing over the edge of the belt at this point.

The metallic content which is retained on the concentrator belt 29 by reason of its higher specific gravity is carried over the end roller with the concentrator belt until it reaches a point preferably at the lowest elevation of the concentrator belt on the under or return stretch, at which it comes into contact with a spray of water from the water conduit 94, so that the concentrate is washed from the belt and passes into a suitable receptacle 95 and is automatically carried to a desired point of utilization.

As the upper surface of the concentrator belt leaves the first roller 33 and engages the slatted belt, the lower edge of the concentrating belt projects beyond the curved end 23 of the slats and forms a vertical dripping edge 96 until it engages the rollers 84. This vertical edge 96 is necessary to obtain a perfectly clean drip, thereby preventing any capillary flow of water to the sprocket chain or working parts of the machine, as has heretofore been the case where the ordinary construction of concentrator belt is employed and where the belt is supported in the usual manner.

It will be apparent to those skilled in this art that in accordance with my invention a novel movement is imparted to the concentrator belt and owing to such movement and the manner in which the pulp and wash water are fed I am enabled to obtain highly advantageous results and a very high percentage of the metallic content of the pulp separated from the gangue. It will be further apparent to those skilled in this art that owing to the novel construction of the bracket 6 and the adjusting means 81 carried thereby, the pitch of the slatted belt and thereby the pitch of the concentrator belt loosely mounted thereon, may be adjusted as desired, so that the points of support of the frame, which I have designated at 90, 91 and 92, may be adjusted so that the diagonal line 93 intermediate the ore dressing zone 85 and the ore washing zone 86 may be varied as desired and not only the pitch of the transversely inclined plane of the ore dressing zone 85 may be varied, but also the longitudinal inclination of the ore washing zone 86. The distributing box may be so adjusted that the pulp will be distributed on the concentrator surface, in such a manner as to permit the sand or heavy portions of the pulp to flow out at suitable points and the lighter portions to overflow.

It will now be apparent that I have devised a novel and useful apparatus for concentrating ores which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In an ore concentrator, a concentrator surface having an ore concentrating zone and an ore washing zone, means for causing the same to travel longitudinally in a transversely inclined rectilinear plane in the ore concentrating zone, and then in a transversely and longitudinally inclined plane in the ore washing zone, pulp feeding means, and water feeding means.

2. In an ore concentrator, a concentrator surface, means for causing the same to travel in a transversely inclined rectilinear plane, and then in a longitudinally inclined and diminishing transversely inclined plane, means for feeding pulp to the upper portion of the concentrator surface, and means for feeding water to the concentrator surface during its travel through the longitudinally inclined plane.

3. In an ore concentrator, an endless belt, means for supporting the upper edge thereof in substantially the same horizontal plane, means for adjustably supporting the opposite side of the belt at different points in lower horizontal planes than the upper edge of the belt, to form an ore concentrating zone extending in a transversely inclined plane and to form an ore washing zone extending in a transversely and longitudinally inclined plane.

4. In an ore concentrator, a slatted belt, a concentrator belt loosely mounted thereon and driven by its frictional engagement therewith and provided with pool forming means along its lower side, means for supporting the slatted belt to form an ore concentrating zone extending in a transversely inclined rectilinear plane which merges into an ore washing zone extending in a transversely and longitudinally inclined plane, and driving means for the slatted belt.

5. In an ore concentrator, a transversely inclined slatted belt, means for causing the slatted belt to travel in the ore concentrating zone in a transversely inclined plane and in the ore washing zone in a transversely and longitudinally inclined plane, a concentrator belt loosely mounted thereon and driven by its frictional engagement with the slats thereof, said concentrator belt having a longitudinally extending reinforcement along its upper edge, a pool forming riffle along its lower edge and an unriffled intermediate surface, and driving means for the slatted belt.

6. In an ore concentrator, a supporting frame yieldingly mounted, a slatted belt carried thereby, means for imparting a continuous travel to the slatted belt, means for reciprocating the frame, a concentrator belt carried by the slatted belt and driven wholly by its frictional engagement therewith, and means for adjusting the inclination of the slatted belt, to form an ore concentrating zone and an ore washing zone for the concentrator belt, the latter traveling through the ore concentrating zone in a transversely inclined plane and through the ore washing zone in a transversely and longitudinally inclined plane.

7. In an ore concentrator, a frame yieldingly mounted, a slatted belt adjustably mounted in the frame, a concentrator belt carried by the slatted belt and driven by its frictional engagement therewith, means for reciprocating the frame, driving means for adjusting the upper portion of the slatted belt near the concentrates discharge end to a plane higher and having a different transverse inclination than the rest of the upper stretch of said slatted belt, pulp feeding means, and water feeding means.

8. In an ore concentrator, a transversely inclined slatted belt, a concentrator belt loosely mounted thereon, means for adjusting the slatted belt near the concentrates discharge end to a plane higher and having a different transverse inclination than the rest of the upper stretch of said slatted belt, and driving means for the slatted belt.

9. In an ore concentrator, a transversely inclined slatted belt, a concentrator belt loosely mounted thereon, and having its lower side extending beyond the side of the slatted belt to form a dripping edge, means for adjusting the slatted belt near the concentrates discharge end to a plane higher and having a different transverse inclination than the rest of the upper stretch of said slatted belt, and driving means for the slatted belt.

10. In an ore concentrator, a transversely inclined slatted belt, a concentrator belt loosely mounted thereon and having its lower side extending beyond the side of the slatted belt to form a dripping edge and provided with a pool forming riffle in proximity to its dripping edge, means for supporting the slatted belt to cause the upper stretch of the concentrator belt to travel in a transversely inclined plane and then in a transversely and longitudinally inclined plane, and driving means for the slatted belt.

11. In an ore concentrator, a transversely inclined slatted belt, a concentrator belt loosely mounted thereon and having its lower side extending over the ends of the slats to form a substantially vertical dripping edge, means for supporting the slatted belt to cause the upper stretch of the concentrator belt to travel in a transversely inclined plane and then in a transversely and longitudinally inclined plane, means for preventing the transverse flow of water over the lower side of the concentrator belt as it passes through the transversely and longitudinally inclined plane, and driving means for the slatted belt.

12. In an ore concentrator, a transversely inclined slatted belt, a concentrator belt loosely mounted thereon, guide brackets carried by the slatted belt, stationary guide members co-acting with said brackets on both the upper and lower stretch of the slatted belt, means for supporting the slatted belt to cause the upper stretch of the concentrator belt to travel in a transversely inclined plane and then in a transversely and longitudinally inclined plane, and driving means for the slatted belt.

13. In an ore concentrator, a transversely inclined slatted belt, said slats at one end being deflected upwardly and at the opposite end downwardly, a concentrator belt loosely mounted thereon, and overlapping the downwardly deflected ends of the slats, means for supporting the slatted belt to cause the upper stretch of the concentrator belt to travel in a transversely inclined plane and then in a transversely and longitudinally inclined plane, and driving means for the slatted belt.

14. In an ore concentrator, a transversely inclined slatted belt, a concentrator belt loosely mounted thereon, means for adjusting the slatted belt near the concentrates discharge end to a plane higher and having a different transverse inclination than the rest of the upper stretch of said slatted belt, driving means for the slatted belt, pulp feeding means, water feeding means, and a receiver along the lower side of the concentrator belt.

15. In an ore concentrator, a transversely inclined slatted belt, a concentrator belt loosely mounted thereon, devices for preventing improper movement of the slatted belt, anti-friction devices for supporting the concentrator belt on its return stretch, means for adjusting the slatted belt near the concentrates discharge end to a plane higher and having a different transverse inclination than the rest of the upper stretch of the slatted belt, and driving means for the slatted belt.

16. In an ore concentrator, a transversely inclined slatted belt, a concentrator belt loosely mounted thereon and having an ore concentrating zone and an ore washing zone, means for supporting the slatted belt to cause the upper stretch of the concentrator belt to travel through the ore concentrating zone in a transversely inclined plane and then through the ore washing zone in a transversely and longitudinally inclined plane, means for adjusting the inclination of the slatted belt to vary the transversely and transversely and longitudinally inclined planes, and driving means for the slatted belt.

17. In an ore concentrator, resilient members suitably supported, brackets carried by said members, a framework adjustably carried by said brackets, a slatted belt adjustably mounted in said frame work, means for adjusting the opposite sides of said slatted belt to cause the upper stretch of such belt to travel in a transversely inclined plane and then in a transversely and longitudinally inclined plane, end rollers carried by the frame, a concentrator belt mounted on said rollers and having frictional engagement with said slatted belt, means for reciprocating the frame-work, and driving means for the slatted belt.

18. In an ore concentrator, resilient members suitably supported, brackets carried by said members, a framework adjustably carried by said brackets, a slatted belt adjustably mounted in said frame work, means for adjusting the opposite sides of the slatted belt to cause the upper stretch of such belt to travel in a transversely inclined plane and then in a transversely and longitudinally inclined plane, end rollers carried by the frame, a concentrator belt mounted on said rollers and having frictional engagement with said slatted belt, guides carried by the frame-work, brackets carried by the slats and co-acting with said guides, means for reciprocating the frame-work, and driving means for the slatted belt.

19. In an ore concentrator, resilient members suitably supported, brackets carried by said members, a framework adjustably carried by said brackets, a slatted belt adjustably mounted in said frame-work to cause the upper stretch of such belt to travel in a transversely inclined plane and then in a transversely and longitudinally inclined plane, end rollers carried by the frame, a concentrator belt mounted on said rollers and having frictional engagement with said slatted belt, guides carried by the frame-work, brackets carried by the slats and each having a plurality of contact faces, one of such faces co-acting with the guides on the upper stretch of the slatted belt and the other of said faces co-acting with said guides on the lower stretch of the belt, means for reciprocating the frame-work, and driving means for the slatted belt.

20. In an ore concentrator, the combination with end rollers, of means for supporting said rollers in a transversely inclined plane, a concentrator belt loosely mounted on said rollers, frictional driving means engaging the upper stretch of the belt intermediate said rollers to impart to the latter a continuous longitudinal travel through a transversely inclined plane in the ore dressing zone of the belt and through a transversely and longitudinally inclined plane through the ore washing zone of the belt, means for feeding pulp to the ore dressing zone of the belt, and means for feeding water to the ore washing zone of the belt in a direction reverse to the longitudinal travel of the belt whereby the wash and pulp waters will converge in a diagonal line, and means for preventing the flow of wash water from the lower side of the belt as the latter is passing through the ore washing zone.

21. In an ore concentrator, laterally extending members suitably supported, vertically arranged springs carried by said members, brackets secured to the upper end of said springs, a frame-work secured to said brackets, means for adjusting said frame-work near the concentrates discharge end to a plane higher and having a different transverse inclination than the rest of said framework, a yielding support mounted in said frame-work, driving means therefor, a concentrator belt loosely mounted on said support and driven by the frictional engagement of the latter with the upper stretch of said belt, means for feeding pulp to said belt transversely to the direction of its travel, and means for feeding water to said belt in a reverse direction to its travel.

22. In an ore concentrator, laterally extending members suitably supported, vertically arranged springs carried by said members, brackets secured to the upper end of said springs, a frame-work secured to said brackets, means for adjusting said framework to bring the slatted belt near the concentrates discharge end to a plane higher and having a different transverse inclination than the rest of the upper stretch of said slatted belt, means for reciprocating said frame-work, a yielding support mounted in said frame-work, driving means therefor, a concentrator belt loosely mounted on said support and driven by the frictional engagement of the latter with the upper stretch of said belt, means for feeding pulp to said belt transversely to the direction of its travel, and means for feeding water to said belt in a reverse direction to its travel.

23. In a device of the character stated, a concentrator belt, and means in frictional engagement with the under side of the concentrating surface thereof to cause the concentrating surface to travel in a transversely inclined plane through the ore concentrating zone and to travel through a transversely and longitudinally inclined plane in the ore washing zone.

24. In a device of the character stated, a concentrator belt, means in frictional engagement with the under side of the concentrating surface thereof to cause the concentrating surface to initially travel in a transversely inclined plane which subsequently merges into a transversely and longitudinally inclined plane, means for varying the transversely and longitudinally inclined plane of the concentrating surface, and means for discharging water against the return stretch of the concentrating surface of the belt.

25. The combination in an ore concentrator, of a support, rolls carried by said support, a concentrator belt mounted on said rolls, friction driving devices for the concentrator belt, and means for guiding the friction driving devices to cause the concentrator belt to travel through the ore concentrating zone in a transversely inclined plane and through the ore washing zone in a transversely and longitudinally inclined plane.

26. The combination in an ore concentrator, of a resiliently mounted support, rolls carried by said support, means for reciprocating said support, a concentrator belt mounted on said rolls, means frictionally engaging the concentrator belt to impart a continuous travel thereto, and devices for guiding said means to cause the concentrator belt to travel through the ore concentrating zone in a transversely inclined plane and through the ore washing zone in a transversely and longitudinally inclined plane.

27. The combination in an ore concentrator, of brackets resiliently supported, bolts adjustably carried thereby, a frame having a side thereof supported on said bolts, devices for supporting the opposite side of said frame in a common horizontal plane and in a plane higher than the other side of said frame, means for locking said frame in its adjusted position, an endless belt mounted in said frame, and means for driving said belt and oscillating said frame.

28. The combination in an ore concentrator, of brackets resiliently supported, bolts adjustably carried thereby, a frame having a side thereof supported on said bolts, devices for supporting the other side of said frame in a common plane and in a plane higher than the other side thereof, an ore concentrating belt mounted in said frame, driving means therefor, and fastening devices coöperating with said bracket and frame for maintaining the latter in its adjusted position.

29. The combination in an ore concentrator, of brackets resiliently supported, vertically adjustable bolts carried thereby, a frame having a side thereof supported on said bolts, devices for supporting the other side of said frame in a horizontal plane and in a plane higher than the other side thereof, an ore concentrator belt mounted in said frame, driving means for the belt, and fastening devices carried by said brackets and vertically adjustable with respect thereto and coöperating with the frame to maintain the same in its adjusted position.

30. The combination of a concentrator belt, a slatted belt for frictionally driving the latter, the slats of the slatted belt having the sides thereof deflected downwardly, a concentrator belt supported on the slatted belt and extending over the downwardly deflected sides thereof, and actuating means for the slatted belt.

31. The combination of a concentrator belt, a slatted belt for frictionally driving the latter, the slats of the slatted belt having one end thereof deflected downwardly, and the other end thereof deflected upwardly, said ends being covered by said belt, actuating means for the slatted belt, and means for guiding the slatted belt to cause it to travel in predetermined transversely inclined planes in its upper stretch.

32. The combination in an ore concentrator of a transversely inclined slatted belt, having an ore concentrating zone and an ore washing zone and driving means therefor, a concentrator belt driven by its frictional engagement with the concentrator belt and having its lower side extending beyond the side of the slatted belt to form a dripping edge, means for feeding pulp to the concentrating zone, and rollers engaging the lower side of the concentrator belt as it passes through the ore washing zone to prevent flow of water thereover.

33. The combination of a frame resiliently supported and having but three points of support upon each side, a slatted belt mounted in the frame, means for maintaining the three points of support on one side in a common horizontal plane, means for adjusting the three points of support on the other side to vary the transverse and longitudinal inclination of the belt, a concentrator belt driven by its frictional engagement with the slatted belt, means for guiding the upper stretch of the slatted belt to cause the concentrator belt to travel through the ore concentrating zone in a rectilinear plane, and through the ore washing zone in a longitudinally and transversely inclined plane, and driving means for the slatted belt.

PETER H. CRAVEN.

Witnesses:
 H. S. FAIRBANKS,
 C. D. McVAY.

---

Copies of this patent may be obtained for five cents each, by addressing the "Commissioner of Patents, Washington, D. C."